(12) United States Patent
Hashimoto et al.

(10) Patent No.: US 12,395,115 B2
(45) Date of Patent: Aug. 19, 2025

(54) STRUCTURE FOR INSTALLATION OF SOLAR POWER GENERATION PANEL ON ROOF

(71) Applicant: TOYOTA JIDOSHA KABUSHIKI KAISHA, Toyota (JP)

(72) Inventors: Hiroyuki Hashimoto, Gotemba (JP); Kiyoto Sasaki, Shizuoka-ken (JP); Shoichi Iwamoto, Fuji (JP); Kosuke Suzuki, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 18/522,465

(22) Filed: Nov. 29, 2023

(65) Prior Publication Data
US 2024/0266988 A1   Aug. 8, 2024

(30) Foreign Application Priority Data
Feb. 2, 2023  (JP) .................. 2023-014542

(51) Int. Cl.
*H02S 20/24*  (2014.01)

(52) U.S. Cl.
CPC .................. *H02S 20/24* (2014.12)

(58) Field of Classification Search
CPC .................. H02S 20/23; H02S 20/24
See application file for complete search history.

(56) References Cited

U.S. PATENT DOCUMENTS

2013/0119211 A1\*  5/2013  Franklin .................. F24S 25/11
                                                   248/176.1

FOREIGN PATENT DOCUMENTS

| JP | 2002004525 A | \* | 1/2002 |
| JP | 2005098084 A | \* | 4/2005 |
| JP | 2019-143306 A |   | 8/2019 |
| JP | 2020-165233 A |   | 10/2020 |
| JP | 2021-090251 A |   | 6/2021 |
| JP | 2022-082923 A |   | 6/2022 |

OTHER PUBLICATIONS

Machine translation of JP-2002004525-A, Kanda N. (Year: 2002).\*
Machine translation of JP-2005098084-A, Sera M. (Year: 2005).\*

\* cited by examiner

*Primary Examiner* — Mayla Gonzalez Ramos
(74) *Attorney, Agent, or Firm* — SoraIP, Inc.

(57) ABSTRACT

A structure for installing a solar power generation panel on the roof of a building includes a top surface, a side surface surrounding the top surface, extending downward from the top surface, and having a lower edge in contact with the top surface of the roof. A plurality of button-shaped protruding portions are provided, each of which is configured such that the upper surface of each of the protruding portions abuts against and is fixed to each of a plurality of portions on the bottom surface of the photovoltaic power generation panel.

6 Claims, 5 Drawing Sheets

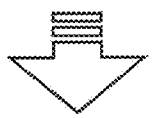
FIG. 4A
2400Pa
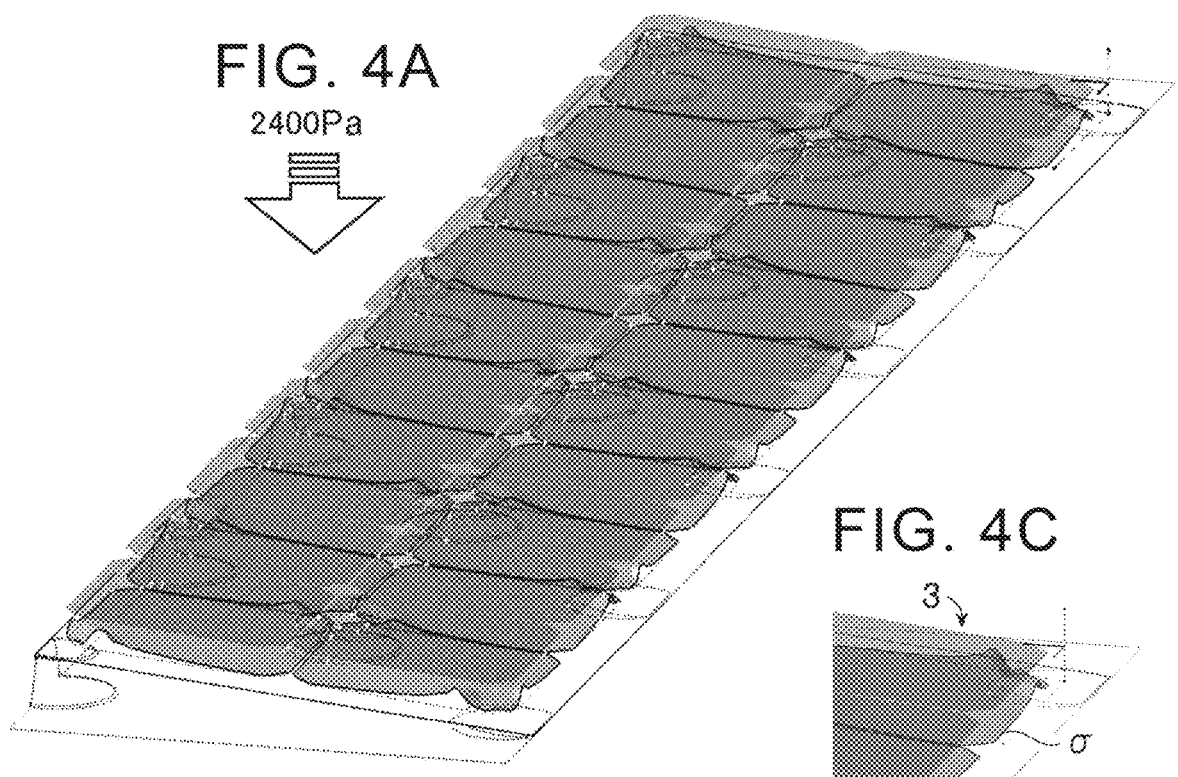
FIG. 4C
FIG. 4B
2400Pa
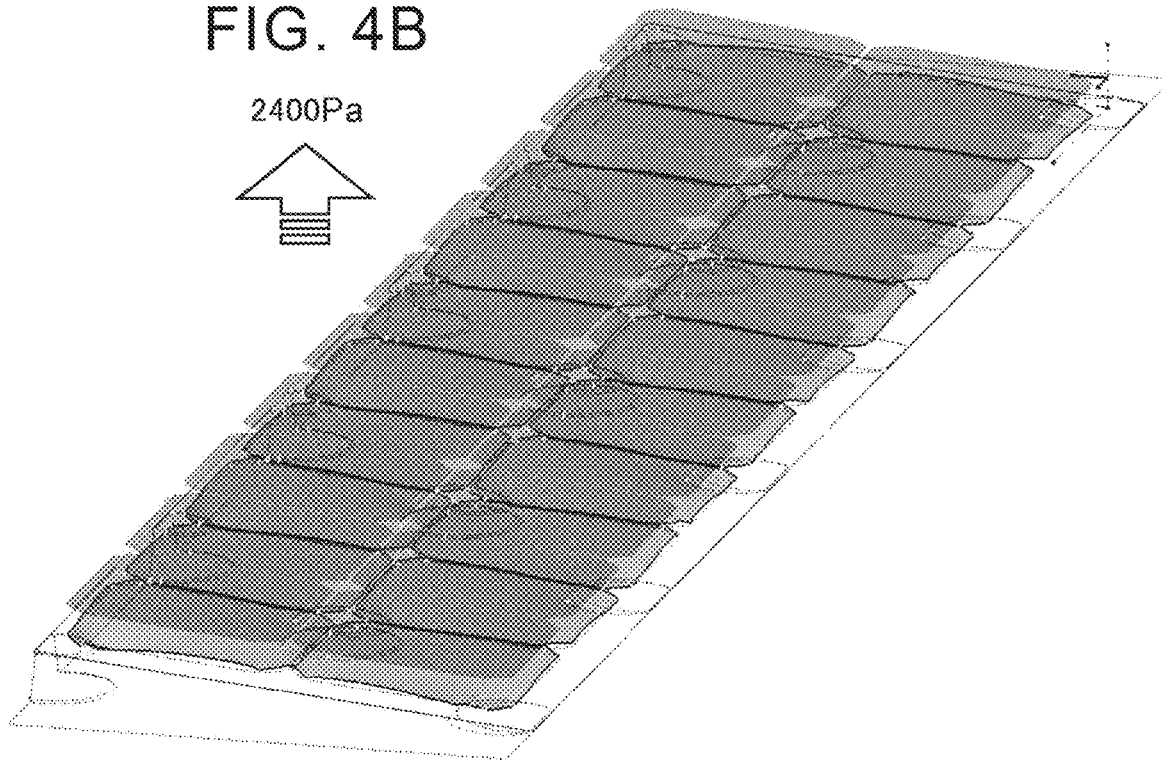

STRUCTURE FOR INSTALLATION OF SOLAR POWER GENERATION PANEL ON ROOF

CROSS-REFERENCE TO RELATED APPLICATION

This application claims priority to Japanese Patent Application No. 2023-014542 filed on Feb. 2, 2023, incorporated herein by reference in its entirety.

BACKGROUND

1. Technical Field

The present disclosure relates to a structure for installation of a solar power generation panel in which a solar cell module in which solar cells are arranged is formed on a plate-shaped panel member, and more specifically, a structure for installation of a solar power generation panel on a roof of a building.

2. Description of Related Art

With the spread of solar power generation, solar power generation panels have been installed in various places, such as on roofs of buildings, mobile objects, and the like that are exposed to sunlight. Along with this, various configurations of structures for installing solar power generation panels have been proposed. For example, Japanese Unexamined Patent Application Publication No. 2022-82923 (JP 2022-82923 A) discloses a configuration in which a solar cell panel that is lightweight and has improved impact resistance is placed on a beam placed on a roof. Japanese Unexamined Patent Application Publication No. 2019-143306 (JP 2019-143306 A) discloses a configuration in which, in order for a solar cell module to have a load resistance suitable for the situation of the installation site, the solar cell module is configured to be provided with a holding frame that has a long shape parallel to an outer edge of a solar cell panel, that includes a side surface portion erected on the side of the outer edge, and that holds the outer edge of the solar cell panel, and a reinforcing part that reinforces the holding frame by being detachably fitted to the holding frame on the side of the solar cell panel rather than the side surface portion, and a beam-shaped support rack disposed on a bottom side of the solar cell module and disposed on the roof is engaged with the holding frame via the reinforcing part by a fixing bracket. Japanese Unexamined Patent Application Publication No. 2021-90251 (JP 2021-90251 A) discloses a configuration of a solar cell module in which, a vertical bar that is a support body that supports a solar cell panel and a frame that holds an outer edge of the solar cell panel is placed on a roof, a fixing bracket that is a fixing part that fixes the frame to the vertical bar is able to slide along a rail groove provided on the frame while being fitted in the rail groove, when the fixing bracket is removed from the vertical bar, and the frame can be easily fixed to the support body regardless of its height. Further, in Japanese Unexamined Patent Application Publication No. 2020-165233 (JP 2020-165233 A), a configuration is disclosed in which, when installing a solar cell module on a roof of a building in which an autoclaved lightweight aerated concrete (ALC) panel is used as a roof material, a prop is erected on a beam that supports the ALC panel, and a bar to which the solar cell module is fixed, is disposed on the prop.

SUMMARY

As disclosed in the above-described related art documents, when installing a solar power generation panel on a roof or the like of a building, typically, a configuration is adopted in which a mount (hereinafter referred to as a "beam-shaped mount") constituted from several beam-shaped or frame-shaped members is disposed on the installation site, and a plate-shaped solar power generation panel is placed thereon. In the case of such a beam-shaped mount, a load is applied intensively to a portion of an installation surface on the roof where the beam-shaped or frame-shaped members of the mount come into contact. Therefore, when disposing the beam-shaped mount on the roof of the building, it is needed to consider the strength and weight restrictions of each portion of the roof, so the beam-shaped or frame-shaped members of the mount cannot be placed anywhere on the roof. For example, in the case of a flat roof made of foamed concrete that has relatively low strength, it is not possible to apply a load to any portion other than the upper surface of the part where the beam supporting the roof panel extends. Therefore, when trying to install a solar power generation panel on such a roof, only a frame that has beam-shaped or frame-shaped members with spacing therebetween that matches spacing between the beams that support the roof panel, can be used. As a result, it is not always possible to configure the mount in such a manner that the installation strength of the solar power generation panel is optimal.

In addition, in a configuration in which the solar power generation panel is installed on the roof of the building using the beam-shaped mount as described above, a point of action at which an external force that the solar power generation panel receives from wind, rain, and snow acts on the member of the beam-shaped mount and a support point at which the member of the beam-shaped mount is supported on the roof surface do not necessarily match, and in this case, a bending moment substantially at the center between the support points of the member of the beam-shaped mount becomes high. More specifically, as shown in FIG. 5A, considering a configuration in which the beam-shaped member F of the beam-shaped mount is supported on the roof surface R at support points C, and the solar power generation panel PVP is fixed at fixing points S on the beam-shaped member F, pressure P acts downward on the solar power generation panel when there is snow, and acts upward on the solar power generation panel when the wind blows. In this case, when the support points C of the beam-shaped member F on the roof surface R and the points of action S of the external force from the solar power generation panel deviate from each other due to the strength of the roof surface R, as shown in the drawing, the bending moment M generated in the beam-shaped member F is high substantially at the midpoint between adjacent support points C, as shown in FIG. 5B. Then, in the beam-shaped or frame-shaped member of the mount, the portion on which such a high bending moment acts needs to be formed so as to have a rigid cross-section that is strong enough to resist it. However, since it is difficult to form part of the beam-shaped or frame-shaped member thick, the beam-shaped or frame-shaped member is formed thick as a whole, and the weight of the mount increases therefor. As a result, in some cases, the weight of the solar power generation panel and the mount exceeds the weight that can be placed on the roof, and the solar power generation panel cannot be installed on the roof.

Alternatively, in order to reduce the weight placed on the roof of the building, it is conceivable to attach the solar power generation panel directly to the roof. However, the lifetime of the roof and the lifetime of the solar power generation panel may be different, for example, and maintenance of the roof and the solar power generation panel may be difficult.

Thus, in view of the circumstances in which the solar power generation panel is installed using the beam-shaped mount as described above, the main object of the present disclosure is to provide a structure for installation of a solar power generation panel that enables installation of the solar power generation panel on roofs of various buildings without using a beam-shaped mount.

According to the present disclosure, the above problems are solved by a structure for installation of a solar power generation panel on a roof of a building in which: a plurality of button-shaped protruding portions is included, the protruding portions each including an upper surface portion and a side surface portion surrounding the upper surface portion and extending downward from the upper surface portion, a lower edge of the side surface portion contacting an upper surface of the roof; and the upper surface portion of each of the protruding portions is configured to contact and be fixed to each of a plurality of portions on a bottom surface of the solar power generation panel.

In the above, the "solar power generation panel" is, as already mentioned, a panel in which a solar cell module composed of a plurality of solar cells, the solar cells arranged in parallel, is placed on a plate-shaped panel member. Each of the solar cells has a substantially rectangular plate-like shape, and the shape of the solar power generation panel may be a substantially rectangular flat plate-like shape in which the solar cells are arranged vertically and horizontally, but is not limited to this. The "button-shaped protruding portion" may be a portion or region having a substantially circular or polygonal shape in horizontal cross section and having a shape protruding upward from the lower edge. Further, in the present disclosure, the upper surface portion of each of the protruding portions contacts and is fixed to each of the plurality of portions on the bottom surface of the solar power generation panel. A fixing portion on the bottom surface of the solar power generation panel may suitably include an edge portion of the solar power generation panel. The number of the protruding portions in the structure may be selected as appropriate. As the contact positions of the protruding portions on the bottom surface of the solar power generation panel, a plurality of portions along an edge of the solar power generation panel at appropriate intervals and appropriate portions inside the edge may be selected as appropriate. The solar power generation panel is placed on the button-shaped protruding portions appropriately arranged on the upper surface of the roof. The horizontal size of the protruding portion may be determined by fitting. The protruding portion may be made of a thin and lightweight metal material, plastic material, or the like.

In the structure for installation of the solar power generation panel according to the present disclosure, unlike the conventional beam-shaped mount in which the beam-shaped or frame-shaped member is arranged so as to run on the upper surface of the roof, the button-shaped protruding portions are arranged at appropriate intervals, and the solar power generation panel contacts and is fixed on the upper surfaces of the protruding portions. With such a configuration, in each protruding portion, a position of the portion fixed to the solar power generation panel, that is, the point of action of external force transmitted from the solar power generation panel to the protruding portion, and a position of the portion in contact with the roof surface, that is, the support point supporting the protruding portion on the roof surface, are approximately the same on the horizontal plane. Therefore, there is no need to increase the thickness of the member in preparation for a high moment due to deviation of the point of action of the external force and the support point, as in the case of the beam-shaped or frame-shaped member of the beam-shaped mount, and the weight of the entire structure is appropriately reduced. It is expected that the shapes and types of roofs increase on which the solar power generation panel can be placed, even when the roof is a roof on which it is difficult to place the beam-shaped mount.

The number of the protruding portions may be adjusted depending on the weight thereof. Typically, the interior of the upper surface portion and the side surface portion of the protruding portion may be hollow. In this case, the shape of the protruding portion is a shape in which a cup is disposed with an opening side thereof in a downward direction, and it is expected that the load acting on the upper surface portion is evenly distributed to the side surface portion surrounding the upper surface portion. Thus, it is possible to obtain light weight and high rigidity strength (in such a configuration, as described later, a hollow box-shaped structure with a substantially rectangular cross section is formed by the bottom surface of the solar power generation panel, the roof surface facing the bottom surface, and the side surface portions of the protruding portions connecting them on both sides, between the adjacent protruding portions on the roof surface, and as a result, the structure is lightweight, and the upper surface portion (the solar power generation panel portion) of the box-shaped structure is provided with a high support function against the external force acting on the vertical direction due to wind and snow). Moreover, in this case, since the weight of each protruding portion can be reduced, the number of the protruding portions can be increased, and accordingly, the solar power generation panel can be supported more stably.

The above-described structure according to the present disclosure may further include a sheet-shaped member adhered to the upper surface of the roof. Each of the protruding portions may be disposed on the sheet-shaped member. For example, in the case of a flat roof made of foamed concrete, which is briefly described above, the portion on which a high load can act locally is limited to a specific portion. In the case of a configuration in which the protruding portions supporting the solar power generation panel are disposed on the sheet-shaped member, the load transmitted from the solar power generation panel to the roof is distributed over the entire sheet-shaped member. Therefore, it is possible to install a solar power generation panel even on a roof where the portion on which a high load can locally act is limited. The sheet-shaped member may be made of a thin and lightweight metal material, plastic material, or the like. The sheet-shaped member may be attached to the roof surface by any method, for example using an adhesive.

In the case of a configuration having the sheet-shaped member described above, the protruding portion may be formed separately from the sheet-shaped member and joined to the sheet-shaped member in any mode. When the protruding portion is a metal sheet, the protruding portion may be formed by pressing on the sheet-shaped member. In this case, the number of parts is reduced, and the structure can be manufactured easily. In addition, when the protruding portions are formed by pressing on the sheet-shaped member, the positioning of the protruding portions can be completed simply by disposing the sheet-shaped member, and a laying process of the solar power generation panel can be simplified, which is advantageous. The configuration in which the protruding portion protrudes from the sheet-shaped member may be configured by molding a plastic material, and this case also belongs to the scope of the present disclosure.

In the above-described configuration, attachment of the solar power generation panel to the protruding portion may be accomplished using a fastener such as a bolt, for example. In this regard, generally, in the solar power generation panel placed on the structure according to the present disclosure described above, the solar cells are aligned and apposed on the panel. It is not desirable to perforate a hole or the like for attaching a bolt or the like to fix the protruding portion to the solar cell. In addition, when a plurality of adjacent solar cells can be supported by one protruding portion, the number of the protruding portions formed or installed on the structure can be reduced, and the process of fixing the solar power generation panel to the structure can be simplified. Therefore, in the above-described structure according to the present disclosure, the upper surface portion of each of the protruding portions may be fixed between corner portions (to a plate-shaped panel member portion) that are close to each other of adjacent two or four solar cells of a plurality of solar cells, the solar cells being apposed on the solar power generation panel. As a result, the fixing portion may be suppressed to be at the solar cell itself, and each protruding portion may be able to simultaneously hold a plurality of solar cells.

By the way, when the solar power generation panel is installed on the roof, the orientation of the solar power generation panel is often inclined so that the light-receiving surface of the solar power generation panel is as close to vertical as possible to the traveling direction of the sunlight. In the structure according to the present disclosure described above, surfaces of the upper surface portions of the protruding portions may be inclined with respect to the upper surface of the roof such that an extending direction of the solar power generation panel is inclined with respect to the upper surface of the roof. With such a configuration, it is possible to achieve adjusting the orientation of the solar power generation panel at the same time as the solar power generation panel is placed on the protruding portion of the structure, and the installation work on the roof is simplified.

Thus, according to the above-described present disclosure, with a configuration in which the button-shaped protruding portions are appropriately disposed on the roof surface, and the solar power generation panel is disposed thereon, the solar power generation panel is installed on the roof without using the beam-shaped mount. With such a configuration, it is possible to install the solar power generation panel on various roofs on which it is difficult to use the beam-shaped mount, and the types and shapes of roofs on which the solar power generation panel can be installed are varied. In particular, in a mode in which the sheet-shaped member is placed on the roof surface and the protruding portion is formed on the sheet-shaped member, it is possible to install the solar power generation panel even on the flat roof made of foamed concrete on which the solar power generation panel was not able to be installed in the past.

Other objects and advantages of the present disclosure will become apparent from the following description of preferred embodiments of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4A shows the stress distribution when the positive pressure (from top to bottom) acts on the structure in the stress distribution calculated using the finite element method when positive pressure and negative pressure act on the structure according to the present embodiment in which a solar power generation panel is mounted;

FIG. 4B shows the stress distribution when negative pressure (from bottom to top) acts on the structure in the stress distribution calculated using the finite element method when positive pressure and negative pressure act on the structure according to the present embodiment in which the solar power generation panel is mounted;

FIG. 4C is an illustration of how to view the diagrams of FIGS. 4A and 4B;

DETAILED DESCRIPTION OF EMBODIMENTS

Figure 1A:
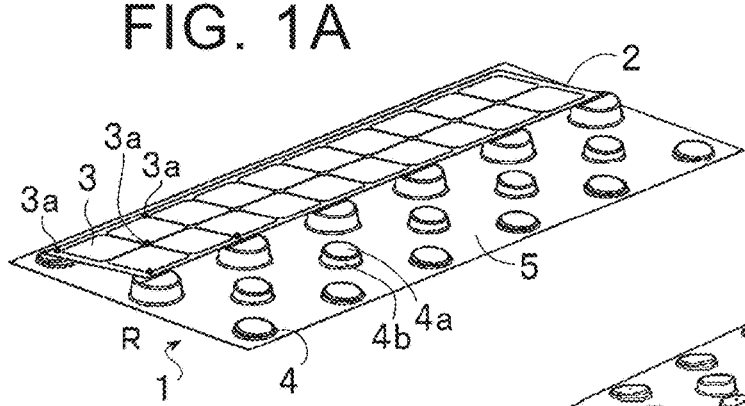
FIG. 1A is a schematic perspective view of a structure for installing a solar power generation panel on a roof according to the present embodiment, showing a state where a solar power generation panel is partially placed.

The disclosure will now be described in detail with respect to some preferred embodiments with reference to the accompanying drawings. In the drawings, the same reference numerals denote the same parts.

Figure 1B:
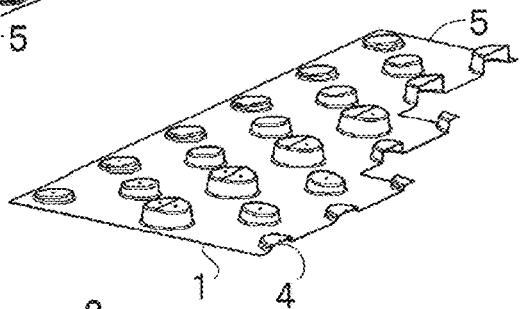
FIG. 1B is a schematic perspective view of the structure of FIG. 1A, drawn partially broken.
Figure 1C:
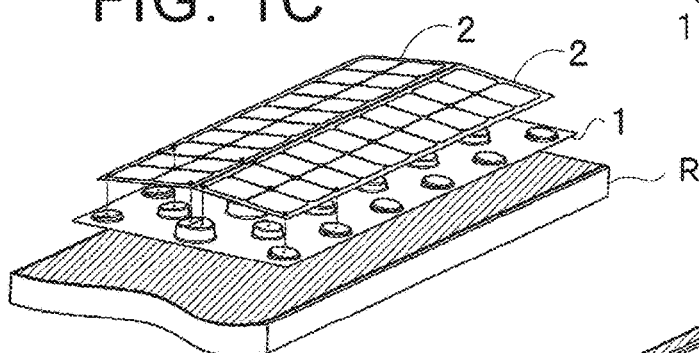
FIG. 1C is a perspective view schematically depicting a process of installing a solar power generation panel using the structure of FIG. 1A on the roof.
Figure 1D:
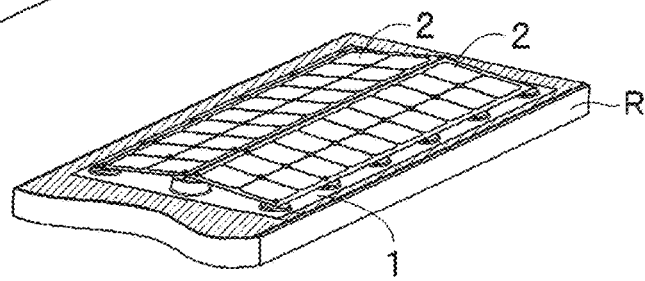
FIG. 1D is a schematic perspective view of the structure of FIG. 1A with solar power generation panels installed on the roof.

Basic Configuration of a Structure for Installation of Solar Power Generation Panels As schematically depicted in FIGS. 1A to 1G, in a structure 1 (hereinafter referred to as "structure") for installing a solar power generation panel 2 according to the present embodiment on a roof surface, basically, a plurality of button-shaped protruding portions 4 are formed on the roof surface R, that is, the upper surface portion 4a is substantially circular (or rectangular), and extends downward from the upper surface portion 4a. Portions or regions having a shape extending so as to surround the roof surface R and having a lower edge in contact with the roof surface R are juxtaposed at appropriate intervals, and as shown in FIGS. 1C and 1D, the solar power generation panel 2 is mounted and fixed on the upper surface portion 4a of the protruding portions 4. According to such a configuration, it is expected that the solar power generation panel 2 can be installed even on a roof of a type on which it is difficult to install a beam-shaped frame as in the past, as long as the structure has the above configuration. It becomes possible to increase the types of roofs on which the solar power generation panel 2 can be installed.

Figure 1E:
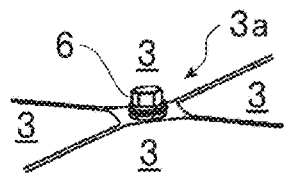
FIG. 1E is a schematic perspective view of a portion for fixing a solar power generation panel to the protruding portion of the structure of FIG. 1A.
Figure 1G:
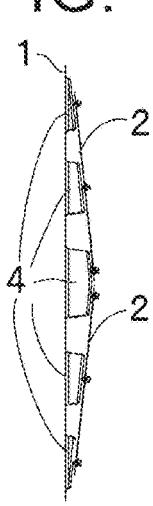
FIG. 1G is a schematic side view thereof.
Figure 1F:
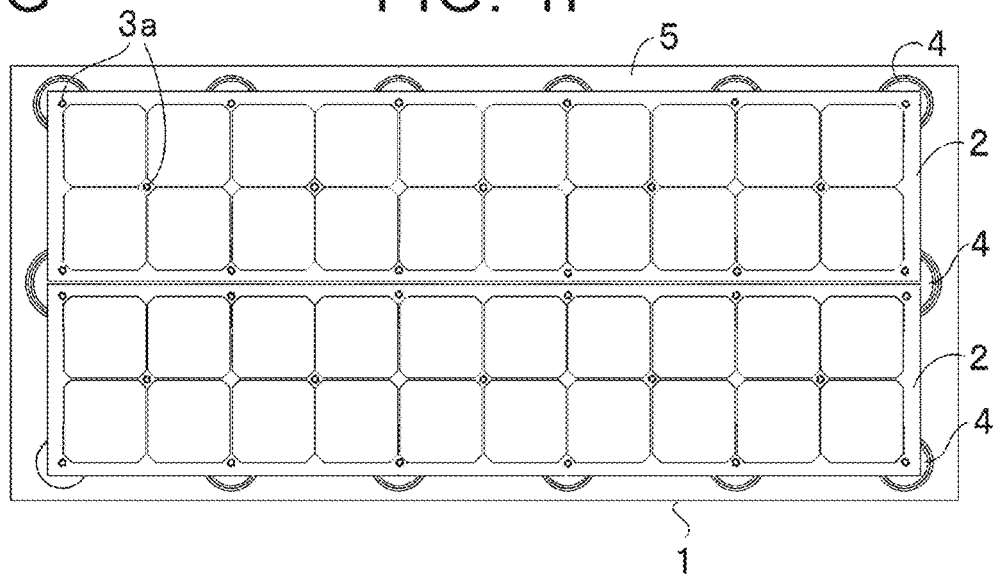
FIG. 1F is a schematic plan view of the structure of FIG. 1A with solar power generation panels installed on the roof.

In such a configuration, when fixing the solar power generation panel 2 to the upper surface portion 4a of the protruding portion 4, for example, as shown in FIG. 1E, fasteners 3a such as bolts 6 to be fastened on the upper surface portion 4a through the solar power generation panel 2 may be preferably used. In this regard, since a plurality of solar cells 3 are juxtaposed on the solar power generation panel 2 as shown in the drawing, it is not preferable to attach the fasteners 3a through the solar cells 3. Fasteners 3a may be provided between edges or corners of adjacent solar cells 3. According to such a configuration, one protruding portion 4 supports two or four solar cells 3, which is advantageous in that the number of protruding portions 4 can be saved and the total weight of the structure can be reduced. In the embodiment, specifically, as shown in the figure, in the solar power generation panel 2, when the square solar cells 3 are arranged vertically and horizontally, the fasteners 3a are provided along the edge of the solar power generation panel 2, along with every other parallel solar cell 3, inside the solar power generation panel 2, approximately in the center where the corners of the four solar cells 3 meet may be provided, but is not so limited.

A Configuration in Which the Protruding Portion is Formed on the Sheet-Shaped Member As one aspect, the protruding portions 4 in the structure 1 of the present embodiment may be formed on a sheet-shaped member 5 adhered to the roof surface R as shown in the drawing. The sheet-shaped member 5 may be made of a thin and lightweight metal material, plastic material, or the like, and may be adhered to the roof surface R by any method, for example, using an adhesive. With such a configuration, the load transmitted from the solar power generation panel 2 to the roof surface R is dispersed over the entire surface of the sheet-shaped member 5 in contact with the roof surface R. Thus, there is no portion or region on the roof surface R where the load acts locally in a concentrated manner. Thus, if the structure according to the present embodiment having the sheet-shaped member 5 is used, even in a roof of a type such as a flat roof made of foamed concrete, where a high load can be locally applied is limited to a specific portion, it becomes possible to install the solar power generation panel 2. In this configuration, each protruding portion 4 is positioned on the horizontal plane between the point of action of the external force transmitted from the solar power generation panel 2 and the support point supporting each protruding portion 4 on the roof surface R, are substantially the same, the portion of the sheet-shaped member 5 between the adjacent protruding portions 4 does not act on a high moment due to the deviation between the point of action of the external force and the supporting point, and the sheet-shaped member 5 does not need to be thickened in preparation for a high moment as in the case of the beam-like or frame-like members of the beam-like frame, and the weight of the entire structure 1 can be appropriately reduced.

The configuration in which the protruding portions 4 are arranged on the sheet-shaped member 5 is typically obtained by subjecting the thin plate-like material, which is the base of the sheet-shaped member 5, to press working, as shown in FIG. 1B. As shown, a plurality of protruding portions 4 may be formed by protruding a portion of the sheet-shaped member 5. According to such a method, the number of parts required to configure the structure 1 can be reduced, and the structure 1 can be manufactured easily. Further, when the structure 1 is installed on the roof surface R, there is no need to position each of the plurality of protruding portions 4, which is advantageous in that the process of installing the structure 1 on the roof is simplified.

Figure 2A:
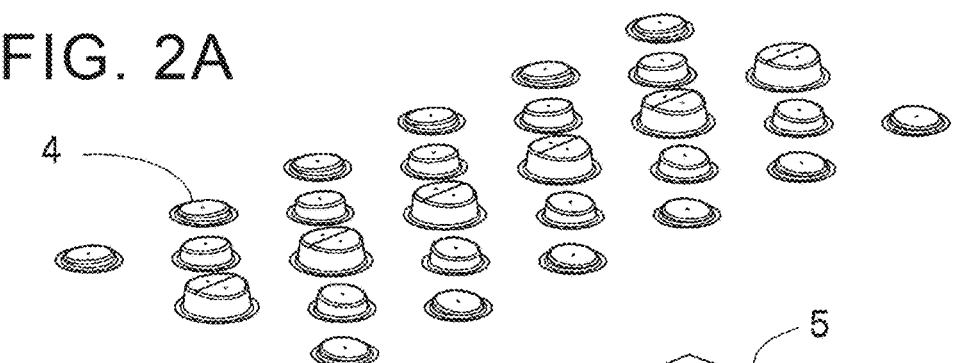
FIG. 2A is a schematic perspective view of a structure for installing a solar power generation panel on a roof according to the present embodiment, which is composed of separately molded protruding portions and sheet-shaped members.
Figure 2B:
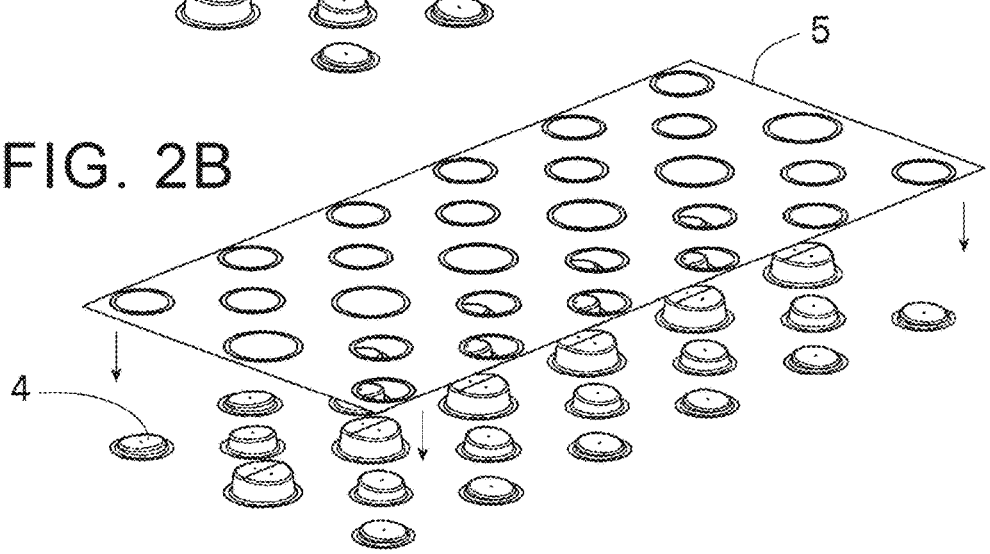
FIG. 2B is a schematic perspective view of a structure for installing a solar power generation panel on the roof according to the present embodiment, which is composed of separately molded protruding portions and sheet-shaped members.
Figure 2C:
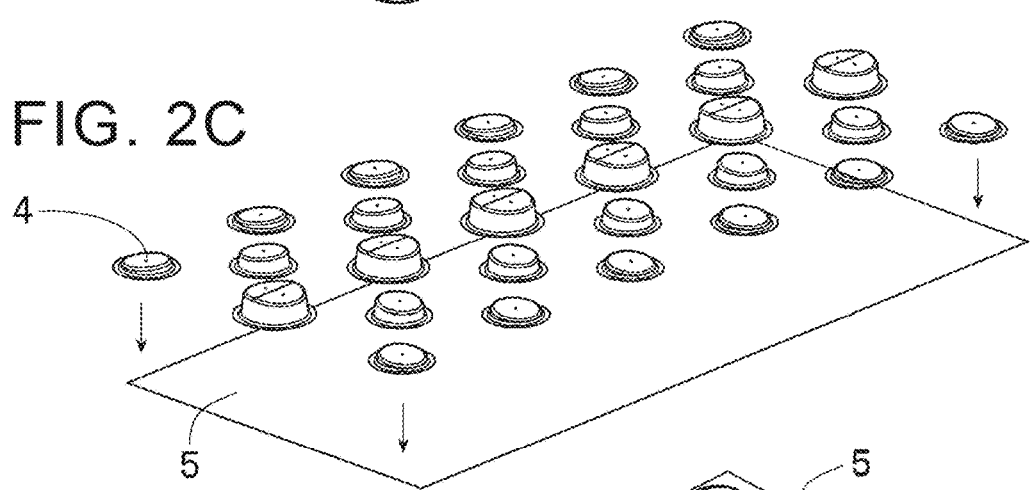
FIG. 2C is a schematic perspective view of a structure for installing a solar power generation panel on the roof according to the present embodiment, which is composed of separately molded protruding portions and sheet-shaped members.
Figure 2D:
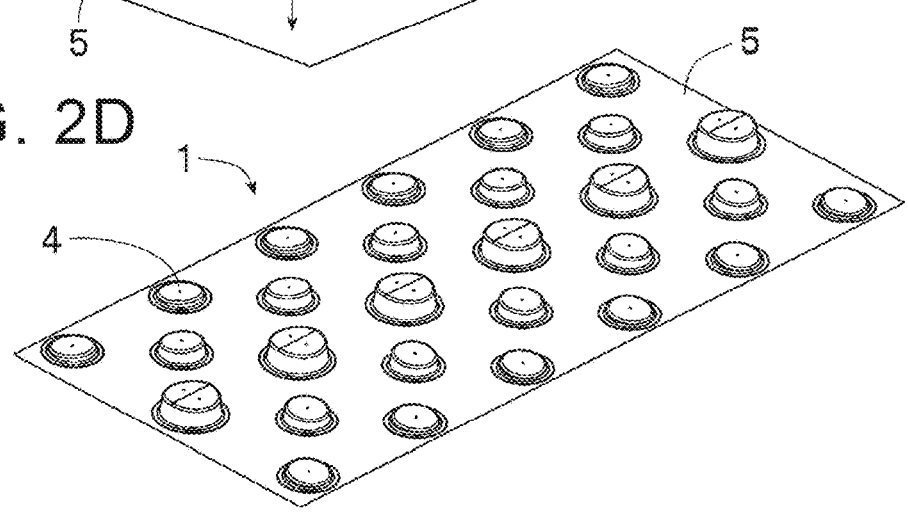
FIG. 2D is a schematic perspective view of a structure for installing a solar power generation panel on the roof according to the present embodiment, which is composed of separately molded protruding portions and sheet-shaped members.

As another aspect, the protruding portion 4 and the sheet-shaped member 5 may be formed separately. In one embodiment, as shown in FIG. 2A, the protruding portion 4 may be arranged, and then, as shown in FIG. 2B, the sheet-shaped member 5 with an opening at a position of the protruding portion 4 may be disposed, and the opening edge of the sheet-shaped member 5 and the lower edge of protruding portion 4 may be joined to form the structure 1, as shown in FIG. 2D. Alternatively, in another embodiment, as shown in FIG. 2C, protruding portions 4 are placed on a sheet-shaped member 5 (the sheet-shaped member 5 may not have openings) and are joined together. A structure 1 may be formed as shown in FIG. 2D. In any of the above aspects, the joining of the protruding portion 4 to the sheet-shaped member 5 may be performed on the roof surface R. According to this configuration, when working on the roof surface R, it is possible to avoid projections such as water intakes on the roof surface R, change the dimensions of the solar power generation panel 2, and change the arrangement position of the solar cells. It is advantageous in that it is easy to change the shape of the structure 1 immediately on the spot.

Inclination of the Upper Surface Portion of the Protruding Portion

When installing the solar power generation panel 2 on the roof surface R, the solar power generation panel 2 is often installed with a surface thereof inclined with respect to the roof surface R so that the light-receiving surface of the solar power generation panel 2 is oriented toward the sun as much as possible. Therefore, in this embodiment as well, the surface direction of the upper surface portion of the protruding portion 4 for fixing the solar power generation panel 2 is inclined with respect to the roof surface R, and the adjacent protruding portion 4 has a certain height. The protruding portions 4 may be formed so as to gradually increase or decrease along the direction. Specifically, as understood from FIGS. 1B to 1D and 1G, the height of the protruding portions 4 aligned on the roof surface R increases from one edge of the solar power generation panel 2 to the other edge. The protruding portions 4 are formed such that the height is gradually increased or decreased by increasing the height, and the surfaces of the upper surface portions 4a of the protruding portions 4 are inclined at the same angle as the inclination when the solar power generation panel 2 is placed on them. It's okay. According to such a configuration, it becomes easy to adjust the inclination angle of the solar power generation panel 2 in the installation work of the solar power generation panel 2 on the roof surface R. In the example shown in FIG. 1G, in the row of protruding portions 4 from top to bottom, the center protruding portion 4 is the highest, and the height of the protruding portions 4 decreases toward the upper and lower sides. The solar power generation panel 2 is inclined so that the center is higher and the side edges are lower, but the present disclosure is not limited to this. It may be changed as appropriate according to the installation position of the solar power generation panel 2 on the roof surface R, and such cases also belong to the scope of the present embodiment.

Strength of Structure

The protruding portion 4 in the structure 1 of the present embodiment described above may be solid, but typically it may be hollow as understood from FIG. 1B. In addition, when the protruding portion 4 is hollow, the side surface portion 4b surrounding the upper surface portion 4a of the protruding portion 4 is formed around the entire circumference of the upper surface portion 4a so that the strength of the protruding portion 4 is increased and the protruding portion 4 is not easily crushed. It is preferably formed to surround all the way around.

Figure 3A:
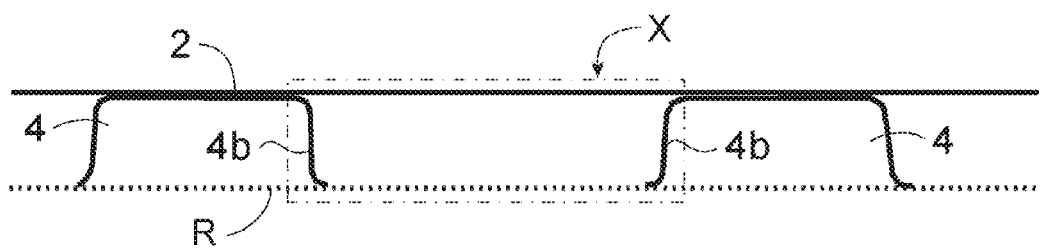
FIG. 3A is a schematic cross-sectional view of adjacent protruding portions in a structure according to the present embodiment with a solar power generation panel mounted thereon.
Figure 3B:
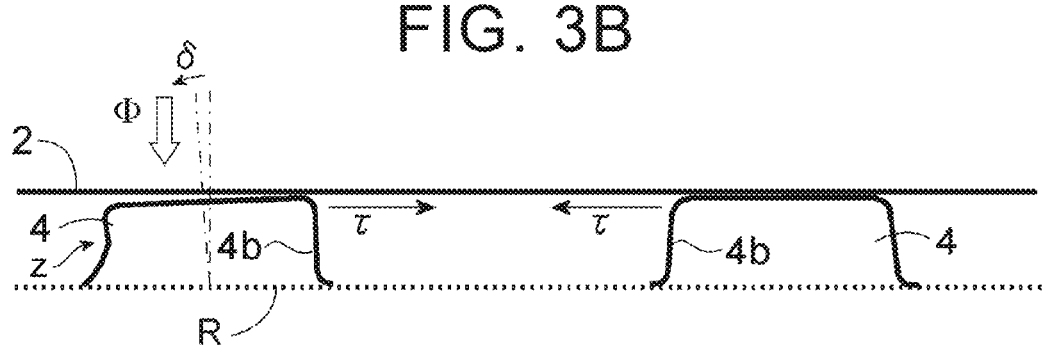
FIG. 3B is a diagram explaining that when force $\Phi$ acts in the direction of buckling the protruding portion in FIG. 3A, a force resisting it acts.
Figure 5A:
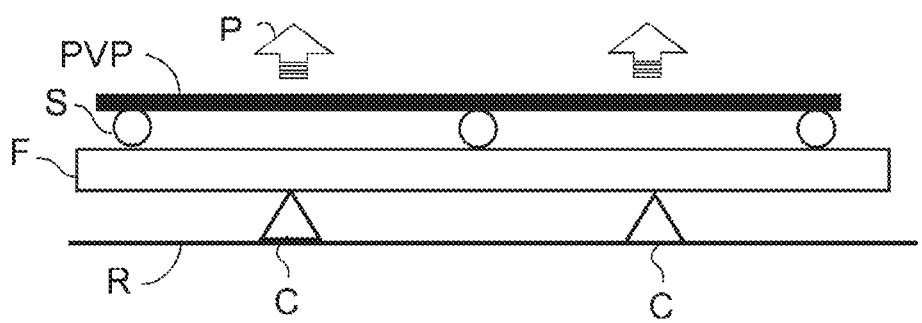
FIG. 5A is a schematic side cross-sectional view of a member of a beam-shaped frame on which a solar power generation panel is mounted.
Figure 5B:
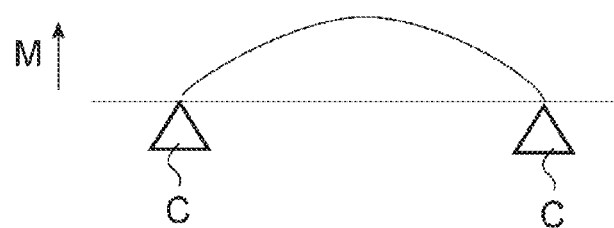
FIG. 5B is a diagram schematically showing the distribution of bending moments acting on members of the beam-like frame in the case of FIG. 5A.

In this respect, as schematically depicted in FIG. 3A, in the structure 1 of the present embodiment described above, two adjacent protruding portions 4 are arranged in a state where the solar power generation panel 2 is mounted. Between them, a generally rectangular box structure X is formed by the opposing roof surface R, the solar power generation panel 2, and the opposing side surface portions 4b of the protruding portions 4. In the case of such a configuration, as shown in FIG. 3B, when a load Φ acts on the solar power generation panel 2 in the vertical direction due to snowfall, rainfall, wind, or the like, the side surface portion 4b of the protruding portion 4 buckles (z), and the upper surface When a displacement δ that tilts the portion is about to occur, a tension τ is generated in the solar power generation panel 2 in a direction against the displacement δ, thereby preventing buckling of the side surface portion 4b. That is, in the present embodiment, as described above, the generally rectangular box structure X is formed between two adjacent protruding portions 4, so that it is lightweight and resistant to snowfall, rainfall, and wind. High support performance against external force is to be obtained.

Further, as described above, the protruding portions 4 of the structure 1 of the present embodiment may be hollow and relatively lightweight. Therefore, the number of protruding portions 4 in the structure 1 may be increased as appropriate, and the number of locations where the solar power generation panel 2 is fixed may be increased to improve the support function of the solar power generation panel 2. For example, if the protruding portions 4 are formed by press working from a sheet-shaped member, even if the number of protruding portions 4 increases, the weight does not change.

Example

Regarding the photovoltaic power generation panel placed on the structure 1 according to this embodiment, when positive pressure (load from top to bottom) acts and when negative pressure (load from bottom to top) acts The finite element method was used to evaluate the distribution of stress generated in the solar power generation panel in. It should be noted that the positive pressure acts when there is snow on the solar power generation panel, and the negative pressure acts when the wind blows near the solar power generation panel.

In the evaluation of the stress distribution, the solar power generation panel 2 is composed of a galvalume steel plate (registered trademark), a first ionomer, a silicon single crystal cell (solar cell), a second ionomer, and an ETFE film, which are laminated in this order and fixed by heating. It was assumed that The Galvalume steel plate (registered trademark) has a thickness of 0.4 mm, the first ionomer has a thickness of 0.8 mm, the silicon single crystal cell has a thickness of 0.18 mm, and the second ionomer has a thickness of 0.4 mm and the thickness of the ETFE film is 0.05 mm. The structure 1 is a Galvalume steel plate (registered trademark) having a thickness of 0.27 mm, and is press-formed so that the protruding portions 4 are arranged vertically and horizontally in the arrangement illustrated in FIGS. 1A to 1G. Protruding portion 4 should be formed. The structure 1 was fixed by adhesion to the flat roof, and the solar power generation panel 2 was placed on the upper surfaces of the protruding portions 4 of the structure 1 and fixed using M5 tapping screws. As to the fixing portion of the solar power generation panel 2 (circled in FIG. 1F), as shown in the drawing, 10 solar cells 3 are apposed in two lines in one solar power generation panel 2. At the edge of the solar power generation panel 2, including the four corners of the panel 2, fixing points are provided at the corners of every other cell. Between the two columns of cells, a fixing point was provided at a position diagonal to the fixing point on the edge of the panel 2 (the panel 2 consists of 4 cells of 2 rows and 2 columns from one end of the panel 2 made into a set, and each set was fixed to the structure 1 at the four corners and five points in the center.). Note that two panels 2 are placed on the structure 1 in FIGS. 1C to 1F. The dimensions of one cell are 156×156 mm, the dimensions of the panel 2 are 1650×360 mm, the inclination angle of the short side direction of the panel with respect to the roof surface is 6°, the height to the highest position of the panel 2 from the roof surface (on the central axis of the structure 1) was assumed to be 50 mm. With this configuration, the design weight of panel 2 is 7500 g/m². In calculating the stress distribution, the stress distribution generated in the panel 2 was calculated using the finite element method while positive pressure and negative pressure were applied at ±2400 Pa of the standard withstand load.

FIGS. 4A and 4B show stress distributions obtained when a positive pressure and a negative pressure are applied to the panel 2, respectively. In the drawing, the area occupied by the solar cells 3 (as shown in FIG. 4C) is drawn in the semi-transparent image on the upper side, and the magnitude of the stress σ is drawn in the opaque image on the lower side. Is According to the calculation results, when the breaking strength of the solar cell is 80 MPa, the maximum cell principal stress is 60 MPa in the case of FIG. 4A (in the case of positive pressure), and in the case of FIG. 4B (in the case of negative pressure), it was 65 MPa (the maximum stress is greater when negative pressure is applied). Therefore, in the above configuration, it was shown by calculation that the solar cell would not be damaged even if the panel's standard withstand load of ±2400 Pa was applied.

Thus, according to this embodiment, there is provided a structure that allows a solar power generation panel to be installed on the roof without using a conventional beam-shaped frame. According to such a configuration, it is possible to install a solar power generation panel even on a type of roof where it is difficult to install a solar power generation panel when using a beam-shaped frame, such as a flat roof made of foamed concrete. As a result, it is expected that the types of roofs on which solar power generation panels can be installed will expand.

Although the above description has been given with reference to the embodiments of the present disclosure, many modifications and changes will readily occur to those skilled in the art, and the present disclosure is limited only to the above-exemplified embodiments. It will be clear that the disclosure is non-limiting and can be applied to a variety of devices without departing from the concept of the disclosure.

What is claimed is:

1. An installation structure for installing a solar power generation panel on a roof of a building, comprising:
   a rectangular sheet; and
   a plurality of button-shaped protruding portions disposed on the rectangular sheet, each of the protruding portions including an upper surface portion and a side surface portion surrounding the upper surface portion and extending downward from the upper surface portion, a lower edge of the side surface portion contacting an upper surface of the roof, and the upper surface portion being fixed to a bottom surface of the solar power generation panel, wherein
   the protruding portions are arranged in first, second, and third rows along a central axis of the rectangular sheet in a long side direction of the rectangular sheet,
   the first row of the protruding portions includes an even number of first protruding portions and is disposed on the central axis,
   the second row of the protruding portions includes an odd number of second protruding portions and is disposed on an outside of the first row of the protruding portions in a short side direction of the rectangular sheet,
   the third row of the protruding portions includes an even number of third protruding portions and is disposed on an outside of the second row of the protruding portions in the short side direction,
   each of the second protruding portions is spaced the same distance from each of two adjacent first protruding portions from among the first protruding portions, and
   each of the second protruding portions is spaced the same distance from each of two adjacent third protruding portions from among the third protruding portions.

2. The installation structure according to claim 1, wherein surfaces of the upper surface portions of the protruding portions are inclined with respect to the upper surface of the roof such that an extending direction of the solar power generation panel is inclined with respect to the upper surface of the roof.

3. The installation structure according to claim 1, wherein the upper surface portion of each of the protruding portions is fixed between corner portions that are close to each other of adjacent two or four solar cells of a plurality of solar cells, the solar cells being apposed on the solar power generation panel.

4. The installation structure according to claim 1, wherein the upper surface portion has a circular shape.

5. The installation structure according to claim 1, wherein the rectangular sheet is attached to the upper surface of the roof by an adhesive.

6. The installation structure according to claim 1, wherein each of the first protruding portions includes two fixing portions, each of the second protruding portions includes one fixing portion, and each of the third protruding portions includes one fixing portion.

* * * * *